US005989177A

United States Patent [19]

West et al.

[11] Patent Number: 5,989,177

[45] Date of Patent: Nov. 23, 1999

[54] UMBILICUS GIMBAL WITH BEARING RETAINER

[75] Inventors: Richard L. West, Lake Villa; Timothy J. Patno, Mundelein, both of Ill.

[73] Assignee: Baxter International Inc., Deerifield, Ill.

[21] Appl. No.: 08/835,928

[22] Filed: Apr. 11, 1997

[51] Int. Cl.[6] ............................... B04B 7/00; B04B 9/00; F16D 3/00; F16C 1/26

[52] U.S. Cl. ........................... 494/46; 464/106; 464/178; 494/18; 494/19; 494/83

[58] Field of Search .......................... 210/380.1; 494/19, 494/45, 46, 83, 18, 20; 464/106, 178

[56] References Cited

U.S. PATENT DOCUMENTS

| | | | |
|---|---|---|---|
| 2,983,639 | 5/1961 | Jageman . | |
| 3,678,964 | 7/1972 | Andrews . | |
| 3,861,972 | 1/1975 | Glover et al. . | |
| 3,986,442 | 10/1976 | Khoja . | |
| 4,056,224 | 11/1977 | Lolachi . | |
| 4,059,518 | 11/1977 | Rishel | 210/108 |
| 4,108,353 | 8/1978 | Brown . | |
| 4,109,852 | 8/1978 | Brown . | |
| 4,109,854 | 8/1978 | Brown . | |
| 4,109,855 | 8/1978 | Brown . | |
| 4,113,173 | 9/1978 | Lolachi . | |
| 4,114,802 | 9/1978 | Brown . | |
| 4,120,449 | 10/1978 | Brown et al. . | |
| 4,164,318 | 8/1979 | Boggs . | |
| 4,194,684 | 3/1980 | Boggs . | |
| 4,221,322 | 9/1980 | Drago et al. . | |
| 4,230,263 | 10/1980 | Westberg . | |
| 4,245,383 | 1/1981 | Boggs . | |
| 4,261,507 | 4/1981 | Baumler . | |
| 4,344,560 | 8/1982 | Iriguchi et al. . | |
| 4,372,484 | 2/1983 | Larsson et al. . | |
| 4,389,206 | 6/1983 | Bacehowski et al. . | |
| 4,425,112 | 1/1984 | Ito . | |
| 4,439,178 | 3/1984 | Mulzet . | |
| 4,440,195 | 4/1984 | van Dongeren . | |
| 4,459,169 | 7/1984 | Bacehowski et al. . | |
| 4,517,404 | 5/1985 | Hughes et al. . | |
| 4,522,188 | 6/1985 | Houghton et al. . | |
| 4,540,397 | 9/1985 | Lolachi et al. . | |
| 4,636,346 | 1/1987 | Gold et al. | 604/280 |
| 4,710,161 | 12/1987 | Takabayashi . | |
| 4,778,444 | 10/1988 | Westberg et al. . | |
| 4,865,081 | 9/1989 | Neumann . | |
| 4,950,401 | 8/1990 | Unger et al. . | |
| 5,097,870 | 3/1992 | Williams . | |
| 5,160,310 | 11/1992 | Yhland . | |
| 5,215,386 | 6/1993 | O'Dwyer | 384/537 |
| 5,305,799 | 4/1994 | Dal Palû . | |
| 5,362,291 | 11/1994 | Williamson, IV . | |
| 5,514,069 | 5/1996 | Brown et al. . | |
| 5,551,942 | 9/1996 | Brown et al. | 494/45 |

*Primary Examiner*—John Kim

*Attorney, Agent, or Firm*—Bradford R. L. Price; Denise M. Serewicz; Daniel D. Ryan

[57] ABSTRACT

A blood processing centrifuge includes a disposable fluid processing assembly having a fluid processing chamber. Fluid is communicated to and from the fluid processing chamber through a flexible umbilicus. The fluid processing chamber spins while the centrifuge pulls the umbilicus around an axis of centrifugation. The centrifuge engages the umbilicus through a thrust bearing received in a gimbal assembly carried on a rotating wing plate. The gimbal assembly allows the umbilicus to pivot relative to the wing plate under the forces developed during centrifugation. The gimbal assembly includes a bearing retainer adapted to securely retain umbilicus thrust bearings of differing sizes a gimbal that loosely but securely retains the bearing retainer. Clearance between the gimbal and the bearing retainer enable the bearing retainer to accommodate thrust bearings of differing sizes without causing gimbal binding. The ability to accommodate umbilicus thrust bearing of differing sizes enables the thrust bearings to be manufactured to looser tolerances, thereby improving manufacturing ease and economy.

29 Claims, 6 Drawing Sheets

UMBILICUS GIMBAL WITH BEARING RETAINER

BACKGROUND OF THE INVENTION

This invention relates generally to blood processing systems and apparatus. More particularly, the invention relates to centrifuges for processing blood and, specifically, to a mount for supporting a thrust bearing at the middle of an umbilicus used in the fluid processing assembly of such a centrifuge.

Various blood processing systems now make it possible to collect particular blood constituents, rather than whole blood, from donors. Typically, in such systems, whole blood is drawn from a donor, the particular blood component or constituent is removed and collected, and the remaining blood constituents are returned to the donor. By thus removing only particular constituents, less time is needed for the donor's body to return to normal, and donations can be made at more frequent intervals than when whole blood is collected. This increases the overall supply of blood constituents, such as plasma and platelets, made available for health care.

Whole blood is typically separated into its constituents through centrifugation. This requires that the whole blood be passed through a centrifuge after it is withdrawn from, and before it is returned to, the donor. To avoid contamination and possible infection of the donor, the blood is preferably contained within a sealed, sterile system during the entire centrifugation process. Typical blood processing systems thus include a permanent, reusable centrifuge assembly containing the hardware that spins and pumps the blood, and a disposable, sealed and sterile fluid processing assembly that actually makes contact with the donor's blood. The centrifuge assembly engages and spins the fluid processing assembly during a collection procedure. The blood, however, makes actual contact only with the fluid processing assembly, which is used only once and then discarded.

To avoid the need for rotating seals, and to preserve the sterile and sealed integrity of the fluid processing assembly, blood processing systems often utilize centrifuges that operate on the "one-omega, two-omega" operating principle. This principle, which is disclosed in detail in Brown et al., U.S. Pat. No. 4,120,449, enables centrifuges to spin a closed system without the need for rotating seals and without twisting the components of the system. Blood processing systems that make use of the principle typically include a fluid processing assembly that includes a plastic bag that is spun in the centrifuge and that is connected to the blood donor through an umbilicus. The umbilicus is turned back on itself so that an end portion of the umbilicus is coaxially aligned with the axis of rotation of the bag. The intermediate portion of the umbilicus is twisted as the bag is spun to counteract the twisting that would otherwise take place as the bag is spun. The effect is that the end of the umbilicus, which is opposite the bag and is connected to the donor, does not twist as the bag is spun. The sealed, sterile integrity of the fluid processing assembly is thus maintained without the need for rotating seals.

U.S. Pat. No. 5,551,942 to Brown et al., commonly owned by the assignee hereof, discloses one such blood processing apparatus based on the "one-omega, two-omega" operating principle. In this apparatus, a disposable fluid processing assembly having an umbilicus and a processing chamber is mountable within a centrifuge assembly. On end of the umbilicus is held rotationally stationary substantially over the axis of centrifugation. The other end of the umbilicus joins the processing chamber and rotates with the processing chamber around the axis of centrifugation at the two-omega speed. The mid-portion of the umbilicus is supported by a wing plate that rotates around the axis of centrifugation at the one-omega speed. A thrust bearing mounted on the umbilicus permits the umbilicus to rotate relative to the wing plate as the wing plate and the processing chamber turn at different speeds. The thrust bearing slides into a one piece gimbal mounted in a recess provided on the wing plate. The gimbal helps keep the fluid processing assembly properly positioned during the centrifugation procedure. When the procedure is completed, the thrust bearing can be slid out of the gimbal in the wing plate to permit removal of the fluid processing assembly.

In prior fluid processing systems, it has proven difficult to achieve a reliable slide fit between the umbilicus thrust bearing and the one piece gimbal mounted in the recess in the wing plate. Ideally, the retaining forces developed between the thrust bearing and the gimbal should be great enough to reliably hold the thrust bearing against the forces developed during high speed centrifugation, but should not be so great as to distort the gimbal and thereby cause it to bind. This has required that the thrust bearing and the gimbal both be manufactured to very close tolerances. A thrust bearing that is slightly oversized physically distorts the gimbal thereby causing it to bind in the mounting recess. A slightly undersized thrust bearing results in excessive clearance and the possibility of inadvertent disengagement between the thrust bearing and the gimbal during operation. Additionally, the use of plastics in the manufacture of the umbilicus thrust bearing results in dimensional changes with changing humidity conditions. Thus, even when manufactured within the proper range of tolerance, a thrust bearing can still go out of tolerance with changing climatic conditions.

SUMMARY OF THE INVENTION

The invention provides an umbilicus gimbal for retaining and supporting an umbilicus thrust bearing comprising a gimbal and a bearing retainer operable to receive the umbilicus thrust bearing received in and retained by the gimbal.

The invention also provide a mount for supporting the middle portion of an umbilicus from the wing plate of a fluid processing centrifuge. The mount includes an aperture formed in the wing plate, a gimbal mounted within the aperture for pivoting movement around two orthogonally oriented axes, and a bearing retainer mounted within the gimbal and configured to receive and retain the outer bearing race of a thrust bearing mounted on the middle portion of the umbilicus.

The invention also provides a fluid processing system comprising a fluid processing assembly having a fluid processing chamber and an umbilicus coupled to the fluid processing chamber, a thrust bearing on the umbilicus, a centrifuge assembly operable to spin the fluid processing chamber around an axis of centrifugation and including a rotatable chamber assembly for supporting the fluid processing chamber for rotation around the axis of centrifugation and further including a wing plate rotatable around the axis of centrifugation and engageable with the umbilicus to impart a twisting motion to the umbilicus to rotate the fluid processing chamber and the chamber assembly around the axis of centrifugation, a gimbal carried on the wing plate and pivotable relative to the wing plate, and a bearing retainer received in and retained by the gimbal and engaging the thrust bearing to thereby support the umbilicus and couple the wing plate to the umbilicus.

The invention also provides a fluid processing centrifuge operable to spin the fluid processing chamber of a disposable fluid processing apparatus having an umbilicus and a thrust bearing on the umbilicus. The centrifuge includes a centrifuge assembly operable to spin the fluid processing chamber around an axis of centrifugation and having a rotatable chamber assembly for supporting the fluid processing chamber for rotation around the axis of centrifugation and further having a wing plate rotatable around the axis of centrifugation and engageable with the umbilicus to impart a twisting motion to the umbilicus to rotate the fluid processing chamber and the chamber assembly around the axis of centrifugation, a gimbal carried on the wing plate and pivotable relative to the wing plate, and a bearing retainer received in and retained by the gimbal and engaging the thrust bearing to thereby support the umbilicus and couple the wing plate to the umbilicus.

It is an object of the invention to provide a new and improved fluid processing system for processing biological fluids such as whole blood.

It is a further object of the invention to provide a new and improved way of supporting the umbilicus thrust bearing of a disposable fluid processing assembly in a centrifuge of the one-omega, two-omega type.

It is a further object of the invention to support the umbilicus thrust bearing securely and reliably even though the size of the thrust bearing is larger or smaller than the proper nominal dimension.

It is further object of the invention to support the umbilicus thrust bearing in a gimballed manner and without binding even though the thrust bearing is larger than or smaller than the desired nominal size.

It is a further object of the invention to provide a gimballed mount for an umbilicus thrust bearing that can accommodate wide variations in bearing size without compromising retaining security or proper gimbal action.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
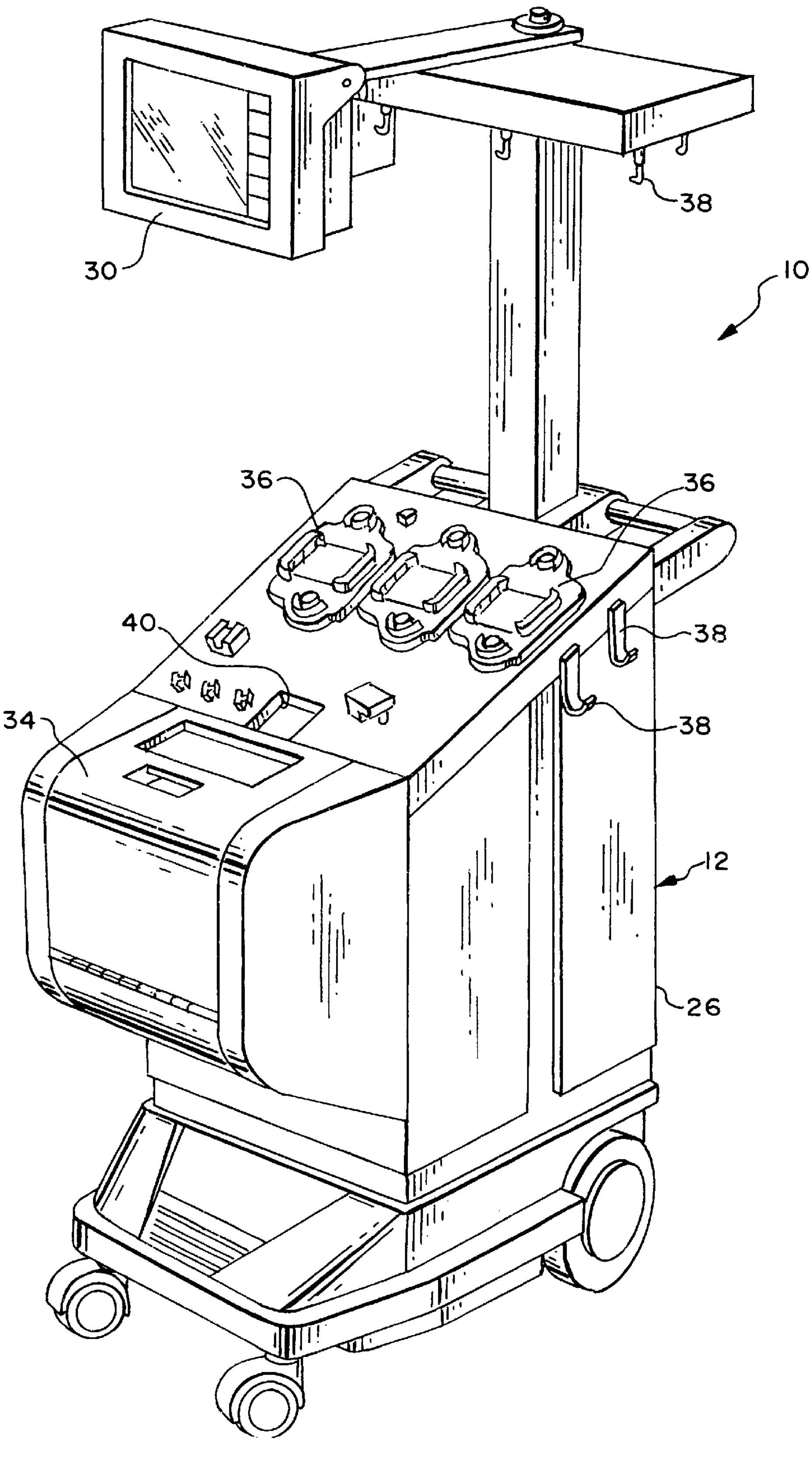
FIG. 1 is a perspective view of a blood processing apparatus embodying various features of the invention.
Figure 2:
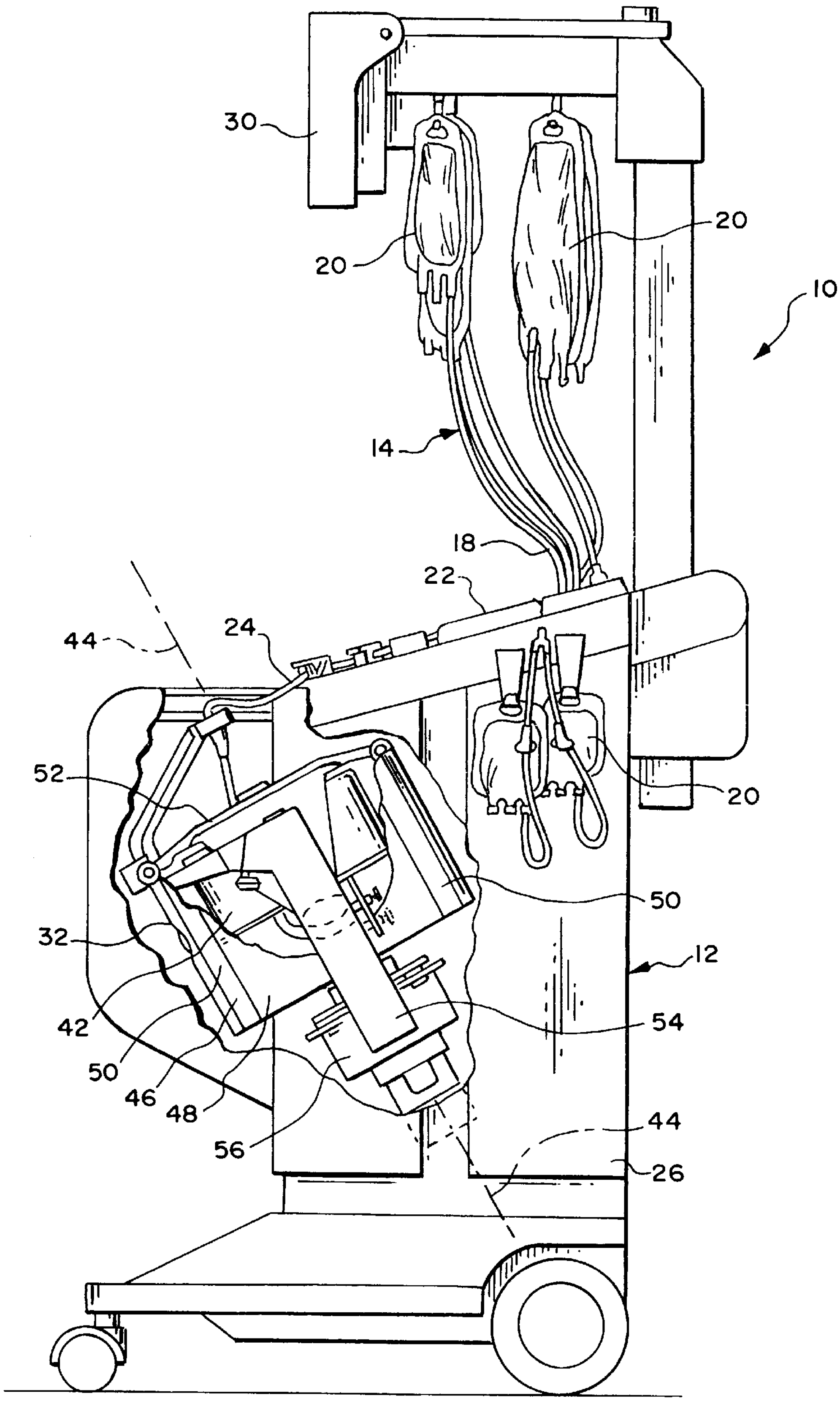
FIG. 2 is a side elevation view, partially in section, of the blood processing apparatus shown in FIG. 1.

Referring to the figures, and, in particular, to FIGS. 1 and 2, a blood processing apparatus 10 is illustrated. The blood processing apparatus 10, which is of the type shown and described in U.S. Pat. No. 5,551,942, the specification of which is incorporated by reference herein, provides a centrifugal processing system that can be used to collect various blood constituents from a donor while returning uncollected constituents back to the donor. The apparatus can also be used to process other suspensions of biological cellular materials.

The blood processing apparatus 10 includes a centrifuge assembly 12 and a fluid processing assembly 14 (FIG. 2) used in association with the centrifuge assembly 12. The centrifuge assembly 12 is a durable equipment item capable of long term, maintenance free use. The fluid processing assembly 14 is a single use, disposable item loaded on the centrifuge assembly 12 at the time of use. After a processing procedure has been completed, the operator removes the fluid processing assembly 14 from the centrifuge assembly 12 and discards it.

Figure 3:
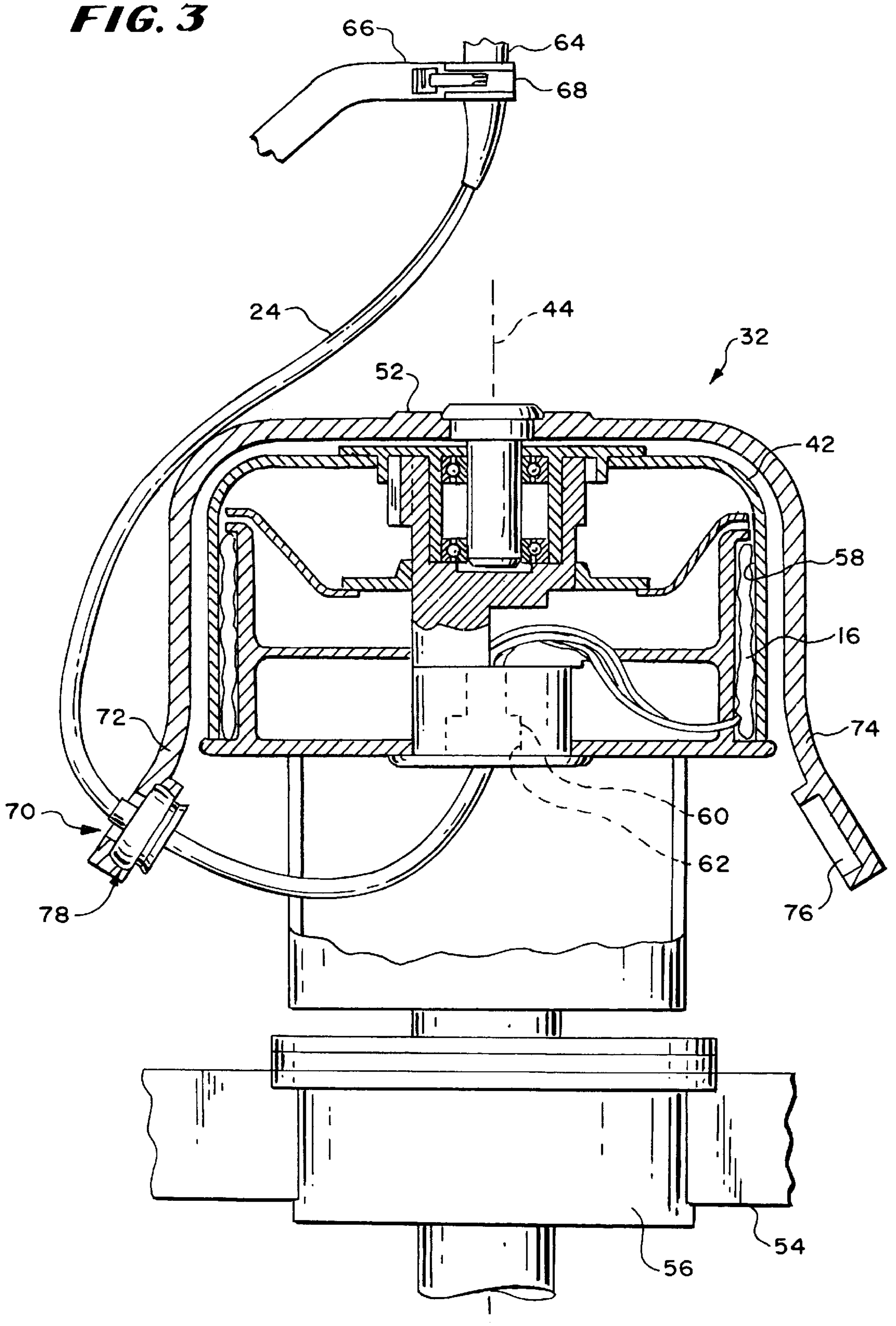
FIG. 3 is a side view, partially in section, of a centrifuge included in the blood processing apparatus of FIG. 1 showing the centrifuge in combination with a fluid processing assembly having an umbilicus supported at its midpoint by a wing plate and an umbilicus gimbal embodying various features of the invention.

The fluid processing assembly 14 includes a processing chamber 16 (FIG.3). In use, the centrifuge assembly 12 rotates the processing chamber 16 to centrifugally separate blood components. Whole blood is conveyed to the processing chamber 16, and separated blood components are conveyed from the processing chamber 16, through a plurality of flexible tubes that form part of a fluid circuit 18. The fluid circuit 18 further includes a plurality of containers 20 that fit on hangers over the centrifuge assembly 12 and that dispense and receive liquids during processing. A plurality of line cassettes 22 that operate in association with valve and pump stations on the centrifuge assembly 12, function to direct liquid flow among multiple liquid sources and destinations during a blood processing procedure. A portion of the tubes interconnecting the processing chamber 16, the containers 20 and the cassettes 22 are bundled together to form a flexible umbilicus 24.

The fluid circuit 18 preconnects the processing chamber 16, the containers 20 and the cassettes 22. The fluid processing assembly 14 thereby forms an integral, sterile unit.

As illustrated, the centrifuge assembly 12 includes a wheeled cabinet 26 that can be easily rolled from place to place. A user actuable processing controller 30 is provided which enables the operator to control various aspects of the blood processing procedure. A centrifuge 32 is provided behind a fold open door 34 that can be pulled open at the front of the cabinet 26. A plurality of valve and pump stations 36 are provided on the top face of the cabinet for receiving and controlling the various line cassettes 22. A plurality of hooks or hangers 38 are provided on the cabinet 26 for suspending the various containers 20.

In use, the fold open door 34 is opened and the processing chamber 16 of the fluid processing assembly 14 is mounted in the centrifuge 32. The umbilicus 24 is threaded through the centrifuge 32 and out through an opening 40 in the upper panel of the cabinet 26. The line cassettes 22 are snapped into respective ones of the valve and pump stations 36, and the containers 20 are hung from the appropriate hangers 38.

After appropriate connections are made to the donor using known intravenous techniques, the operator enters appropriate commands on the processing controller to begin the processing procedure.

Referring in particular to FIGS. 2 and 3, the centrifuge 32 includes a chamber assembly 42 that is supported for rotation around an axis of centrifugation 44. The centrifuge further includes a centrifuge yoke assembly 46 that includes a yoke base 48, a pair of upstanding yoke arms 50, and a yoke cross member 52 mounted between the arms 50. The yoke base 48 is rotatably supported on a stationary platform 54 that carries the rotating mass of the centrifuge 32. The yoke base 48 is also supported for rotation around the axis of centrifugation independently of the chamber assembly 42. An electric drive 56 rotates the yoke assembly 46 relative to the stationary platform 54 around the axis of centrifugation 44. The chamber assembly 42 is free to rotate around the axis of centrifugation 44 at a rotational speed that is different from the rotational speed of the yoke assembly 46.

Referring further to FIG. 3, the chamber assembly 42 defines an annular chamber 58, centered around the axis of centrifugation 44, for receiving the processing chamber 16 of the fluid processing apparatus 14. The umbilicus 24 through which fluids are introduced into and withdrawn from the processing chamber 16 extends through the lower center of the chamber assembly 42 in alignment with the axis of centrifugation 44. A lower support block 60 integrally molded or otherwise mounted onto the umbilicus 24, is received in a lowermost umbilicus mount 62 located at the lower center of the chamber assembly 42. The lower support block 60 and umbilicus mount 62 function to transfer torque between the umbilicus 24 and chamber assembly 42 so that the chamber assembly 42 rotates around the axis of centrifugation in response to twisting of the umbilicus 24 around its axis.

The other end of the umbilicus 24 is supported by means of an upper support block 64 that is removably received in an upper umbilicus mount 66 positioned over the centrifuge chamber assembly 42 substantially in alignment with the axis of centrifugation 44. An over center clamp 68 at the end of the upper umbilicus mount 66 clamps onto the upper support block 64 to hold the adjacent segment of the umbilicus 24 rotationally stationary and in collinear alignment with the axis of centrifugation 44. The upper support block 64 is preferably integrally molded or otherwise securely joined with the umbilicus 24.

As further illustrated in FIG. 3, the portion of the umbilicus 24 between the upper support block 64 and the lower support block 60 is supported by a middle umbilicus mount 70 that is carried at the lower end of a wing plate 72 extending outwardly and downwardly from the yoke cross member 52. As the electric drive 56 rotates the centrifuge yoke assembly 46 around the axis of centrifugation 44, the wing plate 72 and middle umbilicus mount 70 pull the middle portion of the umbilicus 24 around the axis of centrifugation 44 as well. As the umbilicus is so moved, a twisting action is imparted to the umbilicus 24 around its own axis. The middle portion of the umbilicus 24 is free to rotate around its axis relative to the wing plate 72 as the yoke assembly 46 is turned. The umbilicus is thus free to "untwist" against the twisting motion imparted by the rotating yoke assembly 46. As it untwists in this manner, the umbilicus 24 spins the centrifuge chamber assembly 42 around the axis of centrifugation 44.

To maintain balance as the yoke assembly 46 turns, an additional wing plate 74 extends from the yoke cross member 52 diametrically opposite the wing plate 72. A counterweight 76 sufficient to balance the mass of the middle umbilicus mount 70 and umbilicus 24 is carried on the lower end of the additional wing plate 74.

Figures 4, 5:
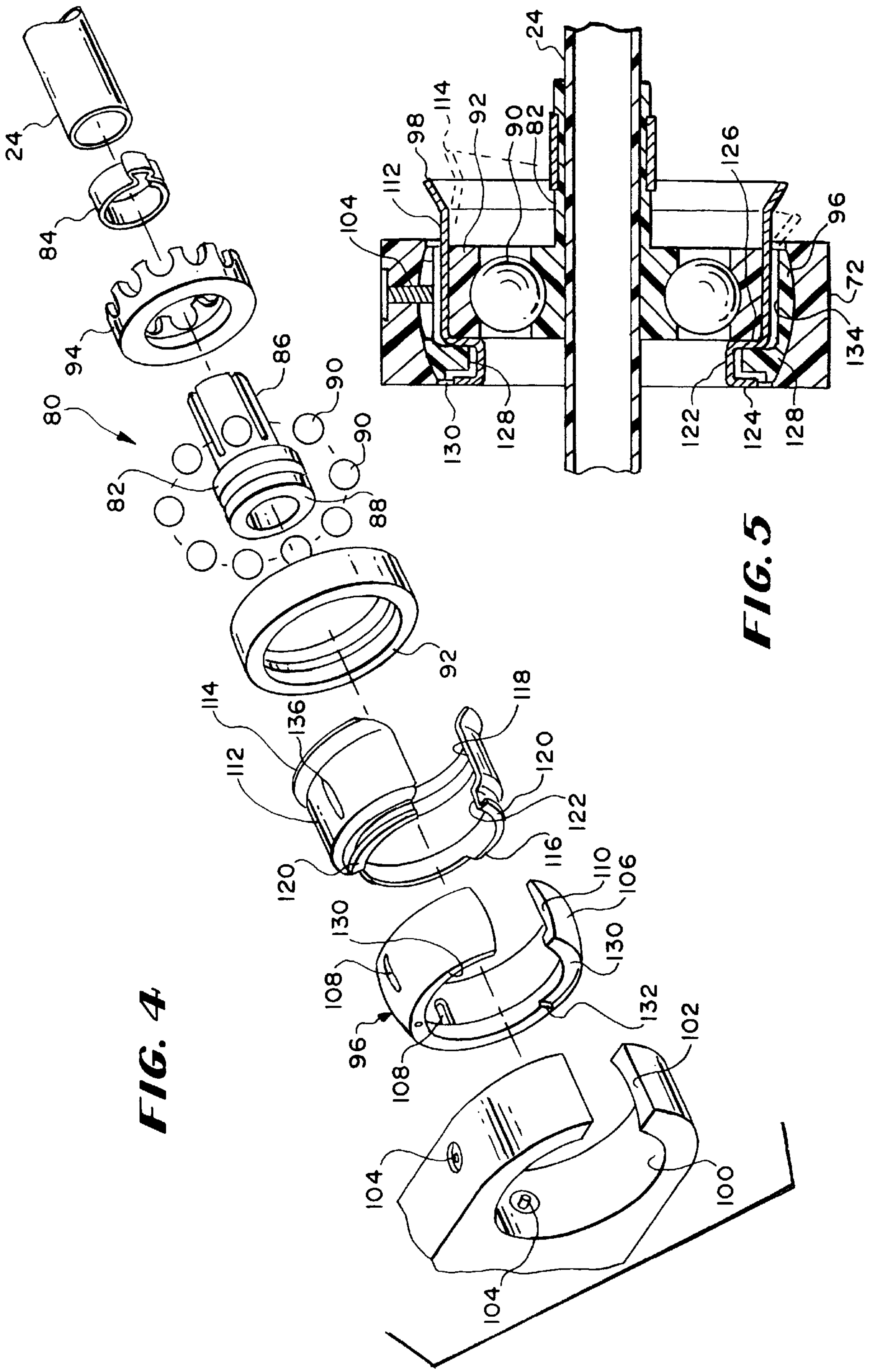
FIG. 4 is an exploded perspective view of an umbilicus thrust bearing and an umbilicus gimbal and bearing retainer included in the blood processing apparatus and embodying various features of the invention.
FIG. 5 is a cross-sectional view of the umbilicus gimbal and bearing retainer shown in FIG. 4.

In accordance with one aspect of the invention, the middle portion of the umbilicus 24 is supported on the wing plate 72 by means of an umbilicus gimbal assembly 78 having a bearing retainer. Referring to FIGS. 3, 4 and 5, the manner in which the middle portion of the umbilicus 24 is supported and carried by the wing plate 72 is shown in detail.

As illustrated, a thrust bearing assembly 80 is located on the umbilicus between the upper and lower support blocks 64 and 60. The thrust bearing assembly 80 includes an inner race 82 in the form of a collar that slips over the umbilicus 24 and is held in place by a retaining clip 84. The inner race includes a slotted forward flange portion 86 that is squeezed against the umbilicus under the clamping force of the clip 84, and further includes a rear race portion 88 that encircles the umbilicus 24 and defines a raceway for a plurality of balls 90. The balls 90, which are preferably formed of a durable metal such as stainless steel, are confined between the inner race 82 and an outer race 92 having a generally annular form as indicated. A cage 94 between the rear race portion 88 of the inner race 82 and the outer race 92 keeps the balls separated and regularly spaced around the inner and outer races 82, 92. The thrust bearing assembly 80 permits the umbilicus to rotate with very little friction relative to the outer race 92, while the clip 84 and forward portion 86 of the inner race 82 resist axial movement of the thrust bearing assembly relative to the umbilicus 24.

Preferably, the inner race 82, the outer race 92 and the cage 94 are machined from high molecular weight thermoplastic/thermoset materials rather than injection molded from thermoplastic materials. By machining rather than molding these parts, the parts can be held to tighter dimensional tolerances (e.g., ±0.001") than is practically and economically achievable using injection molding techniques.

Referring further to FIGS. 3, 4 and 5, the outer race 92 of the thrust bearing assembly 80 is mounted onto the middle umbilicus mount 70 of the wing plate 72 by means of the umbilicus gimbal assembly 78. The umbilicus gimbal assembly 78 comprises a gimbal 96 that is received in the middle umbilicus mount 70 and a bearing retainer 98 that is received in the gimbal 96. The middle umbilicus mount 70 comprises a circular opening 100 formed in the lowermost end of the wing plate 72. Preferably, the sidewall of the circular opening is inwardly or concavely shaped as shown, thereby giving the opening a generally spherical shape. A gap 102 is formed in the end of the wing plate 72 and opens into the circular opening to enable the umbilicus 24 and thrust bearing assembly 80 to be inserted into the middle umbilicus mount 70 from the side. A pair of orthogonally oriented pivot pins 104 extend from the side walls of the wing plate 72 into the interior of the circular opening 100.

The gimbal 96 comprises a generally annularly-shaped member having a ring-like form. The outer sidewalls 106 of the gimbal 96 are outwardly rounded or convex as shown, thereby giving the gimbal 96 a generally spherical shape that matches the shape of the opening 100. IN pair of elongate transverse slots 108 are formed through the sidewalls 106 and are positioned and dimensioned to receive the pivot pins 104 when the gimbal is received in the circular opening 100. The rounded sidewalls 106 of the gimbal 96, together with the elongate slots 108 and pivot pins 104 received therein, enable the gimbal 96 to pivot within the circular opening 100 around two orthogonal axes. A "gimbal" action is thus provided. A gap 110 is formed through the side of the gimbal 96 to permit entry of the umbilicus 24. The gimbal 96 is preferably formed of a durable, rigid, low-friction plastic such as Delrin.

The bearing retainer 98 comprises a generally cylindrical ring-like structure and is preferably formed of a resilient, durable, springy material such as stainless steel. The bearing retainer includes a substantially constant diameter middle segment 112, a flared outer end 114 at one end of the middle segment 112, and a reduced diameter inner end 116 at the other end of the middle segment 112. A gap 118 opening through the side of the bearing retainer permits entry of the umbilicus 24.

In accordance with one aspect of the invention, the bearing retainer 98 and the gimbal 96 are configured so that the bearing retainer is loosely received in the gimbal 96, and yet positively retained in the gimbal 96. To this end, the inner end 116 of the bearing retainer 98 includes a pair of retaining wings or lugs 120, each extending partially around the periphery of the rear end of the middle segment 112. Referring to FIG. 5, each wing 120 defines a substantially square sectioned channel having a bottom wall 122, an outer side wall 124 and an inner side wall 126. The bottom side walls 122 of the wings 120 effectively define a region of reduced diameter as compared with the diameter of the middle section 112 of the bearing retainer 98. As further illustrated in FIG. 5, one end of the gimbal 96 is provided with an integrally formed rim or ledge 128 that is positioned and dimensioned to be received in the channels formed by the wings 120. A pair of clearance slots 130 are formed in the outer end wall of the gimbal 96 to provide clearance for the outer side walls 124 of the wings. The ends 132 of the clearance slots provide abutment surfaces that engage the ends of the side walls 124 to limit rotational movement of the bearing retainer 98 relative to the gimbal 96 when the bearing retainer 98 is received in the gimbal 96.

In further accordance with the invention, the bearing retainer is configured to receive and accommodate umbilicus thrust bearings having outer races 92 of differing diameters. At the same time, gimbal 96 is configured to remain movable within the opening 100 of the wing plate 72 without binding. This is accomplished by providing lateral clearance between the outer side walls of the bearing retainer 98 and the inner side walls of the gimbal 96. Referring to FIG. 5., it will be seen that a gap or space exists between the inner end wall of the gimbal rim 128 and the bottom wall 122 of the bearing retainer wing 120. Similar clearance is provided between the outer side wall 124 of the wing 122 and the radially outlying adjacent portion of the gimbal 96. Finally, similar clearance is provided between the interior side wall 134 of the gimbal 96 and the exterior sidewall of the bearing retainer 98. The clearances thus provided between the bearing retainer 98 and the gimbal 96 enable the bearing retainer 98 to expand to accommodate larger bearing races 92 without interfering with or expanding the size of the gimbal 96. Similarly, the bearing retainer 98 can close down to accommodate outer races 92 of smaller size without compromising the retaining function provided through the interaction of the gimbal ridge 128 with the retaining wings 120. In this manner, the bearing retainer 98 can accommodate thrust bearings of different sizes without affecting the ability of the gimbal 96 to pivot within the opening 100 of the wing plate 72.

To further avoid possible binding of the gimbal 96 and bearing retainer 98 within the opening 100, clearance slots 136 can be formed in the outer side wall of the middle portion 112 of the bearing retainer 98 under the slots 108 of the gimbal 96 to provide clearance for the ends of the pivot pins 104.

As further illustrated in FIG. 5, the middle portion 112 of the bearing retainer 98 is elongated to project well past the sides of the wing plate 72. In addition, the middle portion 112 terminates in the flared outer section 114. These attributes enable the gimbal 96 and bearing retainer 98 carried therewith to pivot around the pivot pins 104 over a wide range before the bearing retainer 98 hits the wing plate 72 and thereby limits further travel.

In use, the bearing retainer 98 is snapped into the gimbal 96 with the retaining wings 120 received in the retaining slots 130. The gimbal 96 and bearing retainer 98 are then inserted into the opening 100 of the wing plate 72 with the pivot pins entering the respective slots 108. The gimbal 96 should, at this point, be freely pivotable relative to the wing plate 72 and the slots 102, 110 and 118 in the wing plate 72, the gimbal 96 and the bearing retainer 98 should all line up. The umbilicus 24 can then be inserted sideways through the slots 102, 110 and 118, and the outer race 92 of the umbilicus thrust bearing assembly 80 is pressed axially into the bearing retainer 98 from the flared end 114. The bearing retainer 98 should expand as necessary to receive the outer race 92 and should firmly grip the outer race 92 with a tight frictional fit to resist withdrawing movement of the thrust bearing assembly 80. At the same time, such expansion of the bearing retainer 98 should be accommodated by the radial clearance between the bearing retainer 98 and the gimbal 96, and the outer dimension of the gimbal 96 should not change. Accordingly, the gimbal 96, and the bearing retainer 98 and thrust bearing assembly 80 mounted therein, should remain freely pivotable relative to the wing plate 72. In this manner, the umbilicus gimbal assembly 78 provides for positive and reliable retention of umbilicus thrust bearings of differing outer dimension without compromising the effectiveness of the gimballing action provided by the assembly 78.

Figure 6:
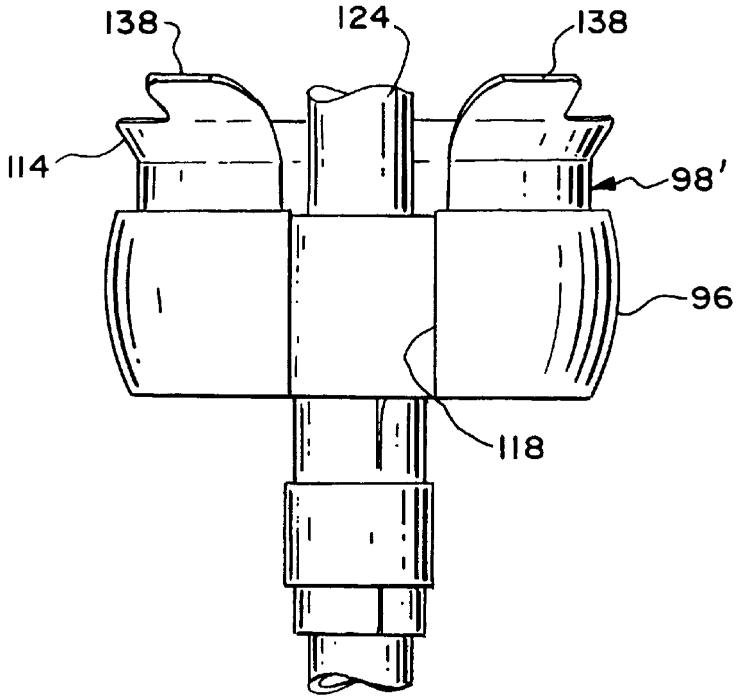
FIG. 6 is front elevation view of an alternate embodiment umbilicus gimbal having alternate bearing retainer configuration intended to facilitate removal of the umbilicus thrust bearing from the bearing retainer.
Figure 7:
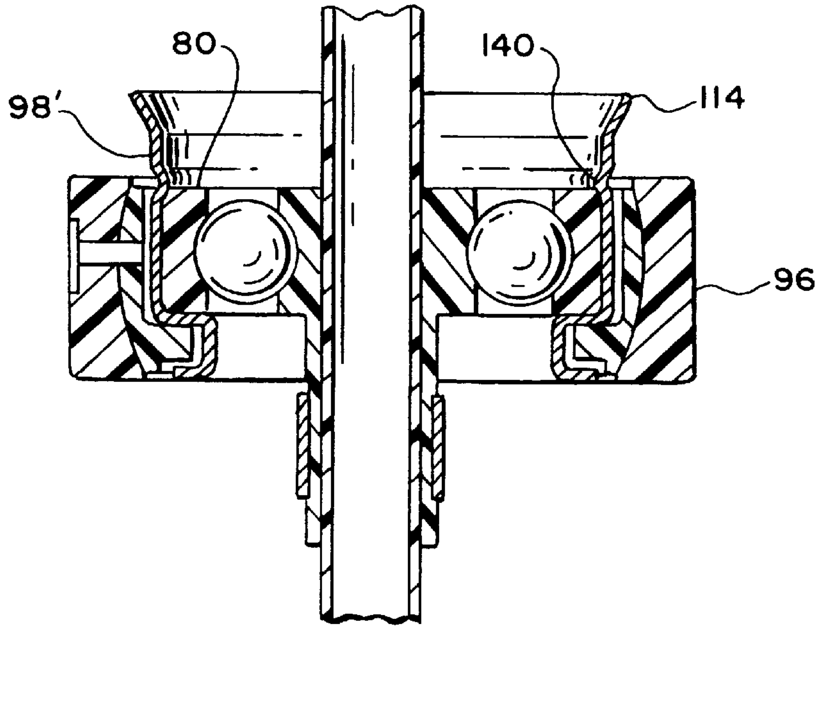
FIG. 7 is a sectional view of the alternate embodiment shown in FIG. 6.
Figure 8:
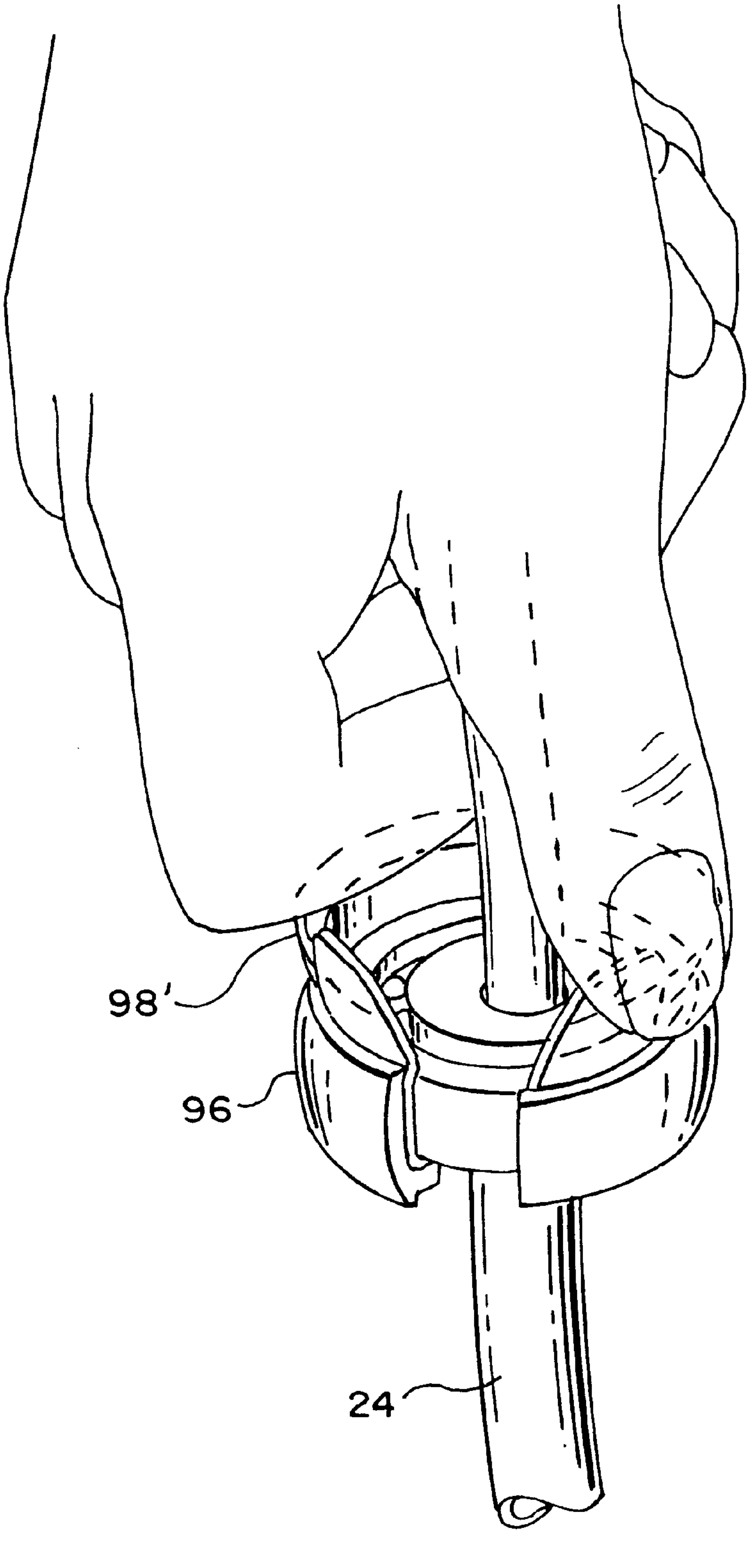
FIG. 8 is a perspective view of the alternate embodiment shown in FIGS. 6 and 7 useful in understanding the use thereof.

An alternate embodiment bearing retainer 98' is shown in FIGS. 6, 7 and 8. In this embodiment, a pair of outwardly projecting thumb tabs 138 are integrally formed in the flared outer end 114 of the bearing retainer 98' adjacent the gap 118. In addition, an inwardly projecting lip or ridge 140 (FIG.7) is formed at the juncture of the flared outer end 114 and the middle segment 112.

The ridge 140 provides an audible or tactile "click" when the thrust bearing assembly 80 is fully and properly seated in the bearing retainer 98'. In addition, the ridge 140 resists withdrawing movement of the thrust bearing assembly 80 once seated and helps retain the thrust bearing assembly 80 within the bearing retainer 98'.

It will be appreciated that the thumb tabs 138 and the ridge 140 can be included each separately or in combination with each other as desired.

The thumb tabs 138 facilitate removal of the thrust bearing assembly 80 from the bearing retainer 98' following a processing procedure. By wrapping four fingers of the hand around the downstream portion of the umbilicus and thereafter pressing down on one of the tabs 138 with the thumb as shown in FIG. 8, the thrust bearing assembly 80 is forced upwardly out of and away from the bearing retainer 98'.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A centrifuge comprising a rotating element, an umbilicus that conveys fluid, a thrust bearing carried by the umbilicus, a gimbal on the rotating element to retain and support the thrust bearing during rotation of the rotating element.

2. A centrifuge as defined in claim 1 and further including a bearing retainer received in and retained by the gimbal and being expandable and contractible relative to the gimbal so as to accommodate thrust bearings of various sizes.

3. A centrifuge as defined in claim 2 wherein the bearing retainer is substantially fixed axially relative to the gimbal.

4. A centrifuge as defined in claim 2 wherein the bearing retainer is expandable substantially radially relative to the gimbal.

5. A centrifuge as defined in claim 2 wherein the gimbal comprises a substantially ring shaped member and the bearing retainer comprises a substantially cylindrical member receivable in the gimbal.

6. An umbilicus gimbal for retaining and supporting an umbilicus thrust bearing comprising:

a gimbal comprising a substantially ring shaped member, a bearing retainer receivable in the gimbal comprising a substantially cylindrical member to receive and retain the umbilicus thrust bearing, each of the gimbal and the bearing retainer including a slot for admitting an umbilicus through the gimbal and bearing retainer, the bearing retainer being substantially fixed axially relative to the gimbal and also being expandable and contractible substantially radially relative to the gimbal so as to accommodate umbilicus thrust bearings of various sizes.

7. An umbilicus gimbal as defined in claim 6 wherein the gimbal includes an outer surface having a substantially spherical curvature.

8. An umbilicus gimbal as defined in claim 7 wherein the bearing retainer includes a middle portion having a substantially cylindrical outer surface.

9. An umbilicus gimbal as defined in claim 8 wherein the bearing retainer includes retaining structure at one end of the middle portion for engaging the gimbal to resist axial movement of the bearing retainer relative to the gimbal.

10. An umbilicus gimbal as defined in claim 9 wherein the retaining structure includes one or more retaining wings defining a channel and wherein the gimbal includes an interior ridge receivable in the channel.

11. An umbilicus gimbal as defined in claim 11 wherein the gimbal includes an end wall having a recess formed therein for receiving a retaining wing of the bearing retainer.

12. An umbilicus gimbal as defined in claim 11 wherein the recess defines an abutment surface operable to engage an edge of the retaining wing received in the recess to limit rotational movement of the bearing retainer relative to the gimbal.

13. An umbilicus gimbal as defined in claim 12 wherein the bearing retainer is flared at the end opposite the retaining wings.

14. An umbilicus gimbal as defined in claim 13 wherein the end of the bearing retainer that is flared projects beyond the gimbal.

15. An umbilicus gimbal as defined in claim 14 wherein the gimbal further includes one or more elongate slots for receiving a pivot pin therein.

16. An umbilicus gimbal as defined in claim 15 wherein the gimbal includes a pair of the elongate slots oriented to receive, respectively, two orthogonally oriented pivot pins therein.

17. An umbilicus gimbal as defined in claim 16 wherein the outer surface of the bearing retainer includes a pair of slots for receiving the pivot pins therein.

18. An umbilicus gimbal as defined in claim 17 wherein the bearing retainer includes an interior ridge for retaining the umbilicus thrust bearing.

19. An umbilicus gimbal as defined in claim 18 wherein the bearing retainer includes a thumb tab for facilitating removal of the umbilicus thrust bearing from the bearing retainer.

20. A mount for supporting the middle portion of an umbilicus from the wing plate of a fluid processing centrifuge comprising:

an aperture formed in the wing plate, a gimbal mounted within the aperture for pivoting movement around two orthogonally oriented axes, and a bearing retainer mounted within the gimbal and configured to receive and retain the outer bearing race of a thrust bearing mounted on the middle portion of the umbilicus.

21. A fluid processing system comprising:

a fluid processing assembly having a fluid processing chamber and an umbilicus coupled to the fluid processing chamber, a thrust bearing on the umbilicus, a centrifuge assembly operable to spin the fluid processing chamber around an axis of centrifugation and including a rotatable chamber assembly for supporting the fluid processing chamber for rotation around the axis of centrifugation and further including a wing plate rotatable around the axis of centrifugation and engageable with the umbilicus to impart a twisting motion to the umbilicus to rotate the fluid processing chamber and the chamber assembly around the axis of centrifugation, a gimbal carried on the wing plate and pivotable relative to the wing plate, and a bearing retainer received in and retained by the gimbal and engaging the thrust bearing to thereby support the umbilicus and couple the wing plate to the umbilicus.

22. A fluid processing centrifuge operable to spin the fluid processing chamber of a disposable fluid processing apparatus having an umbilicus and a thrust bearing on the umbilicus, comprising:

a centrifuge assembly operable to spin the fluid processing chamber around an axis of centrifugation and including a rotatable chamber assembly for supporting the fluid processing chamber for rotation around the axis of centrifugation and further including a wing plate rotatable around the axis of centrifugation and engageable with the umbilicus to impart a twisting motion to the umbilicus to rotate the fluid processing chamber and the chamber assembly around the axis of centrifugation, a gimbal carried on the wing plate and pivotable relative to the wing plate, and a bearing retainer received in and retained by the gimbal and engaging the thrust bearing to thereby support the umbilicus and couple the wing plate to the umbilicus.

23. A centrifuge comprising a yoke element, a motor for rotating the yoke element about a rotational axis, a processing chamber mounted for rotation about a second axis aligned with the rotational axis, an umbilicus having an axis, the umbilicus, in use, conveying fluid to or from the processing chamber, the umbilicus including a proximal end supported above the yoke assembly in alignment with the rotational axis, a distal end coupled to the processing chamber for rotation about the second axis, and a middle region between the proximal and distal ends, a thrust bearing carried by the middle region of the umbilicus, and a gimbal on the yoke element to retain and support the thrust bearing during rotation of the yoke element, the umbilicus rolling about its axis within the gimbal during rotation of the yoke assembly to impart rotation to the processing chamber.

24. A centrifuge as defined in claim 23 wherein the processing chamber is free of a motor for rotating it.

25. A centrifuge as defined in claim 23 and further including a bearing retainer received in and retained by the gimbal.

26. A centrifuge as defined in claim 25 wherein the gimbal comprises a substantially ring shaped member and the bearing retainer comprises a substantially cylindrical member receivable in the gimbal.

27. A centrifuge as defined in claim 23 wherein the bearing retainer is expandable and contractible relative to the gimbal so as to accommodate thrust bearings of various sizes.

28. A centrifuge as defined in claim 23 wherein the bearing retainer is substantially fixed axially relative to the gimbal.

29. A centrifuge as defined in claim 23 wherein the bearing retainer is expandable substantially radially relative to the gimbal.

* * * * *

UNITED STATES PATENT AND TRADEMARK OFFICE

CERTIFICATE OF CORRECTION

PATENT NO. : 5,989,177 
DATED : November 23, 1999
INVENTOR(S) : Richard L. West and Timothy J. Patno It is certified that error appears in the above-identified patent and that said Letters Patent is hereby corrected as shown below:

<u>Column 9,</u>
Line 50, delete "11" and substitue -- 10 --.

Signed and Sealed this

Twenty-second Day of June, 2004

JON W. DUDAS
*Acting Director of the United States Patent and Trademark Office*